United States Patent
Boers et al.

(10) Patent No.: US 7,936,752 B2
(45) Date of Patent: *May 3, 2011

(54) SOURCE SPECIFIC MULTICAST GROUP TO SOURCE MAPPING

(75) Inventors: Arjen Boers, Sitges (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 1051 days.

This patent is subject to a terminal disclaimer.

(21) Appl. No.: 10/208,977

(22) Filed: Jul. 31, 2002

(65) Prior Publication Data

US 2004/0022244 A1 Feb. 5, 2004

(51) Int. Cl.
*H04L 12/28* (2006.01)
(52) U.S. Cl. .................................. 370/390; 370/465
(58) Field of Classification Search .................. None
See application file for complete search history.

(56) References Cited

U.S. PATENT DOCUMENTS

| | | | |
|---|---|---|---|
| 5,959,989 A | 9/1999 | Gleeson et al. | 370/392 |
| 6,182,147 B1 | 1/2001 | Farinacci | 709/238 |
| 6,317,434 B1 * | 11/2001 | Deng | 370/432 |
| 6,331,983 B1 | 12/2001 | Haggerty et al. | 370/400 |
| 6,457,059 B1 * | 9/2002 | Kobayashi | 709/242 |
| 6,597,703 B1 | 7/2003 | Li et al. | 370/428 |
| 6,631,420 B1 | 10/2003 | Li et al. | 709/242 |
| 6,633,765 B1 | 10/2003 | Maggenti et al. | 455/503 |
| 6,654,371 B1 * | 11/2003 | Dunstan et al. | 370/390 |
| 6,711,172 B1 * | 3/2004 | Li | 370/401 |
| 6,853,639 B1 | 2/2005 | Watanuki et al. | 370/390 |
| 6,947,440 B2 * | 9/2005 | Chatterjee et al. | 370/429 |
| 6,963,573 B1 * | 11/2005 | Cain et al. | 370/401 |
| 6,970,461 B2 * | 11/2005 | Unitt et al. | 370/390 |
| 6,988,146 B1 * | 1/2006 | Magret et al. | 709/238 |
| 7,012,891 B1 | 3/2006 | Chandran et al. | 370/230 |
| 7,061,880 B2 * | 6/2006 | Basilier | 370/312 |
| 7,233,987 B2 | 6/2007 | Watkinson | 709/223 |
| 7,310,335 B1 * | 12/2007 | Garcia-Luna-Aceves et al. | 370/390 |
| 7,418,003 B1 * | 8/2008 | Alvarez et al. | 370/432 |
| 7,502,372 B2 * | 3/2009 | Tsuchiya et al. | 370/390 |
| 2002/0191584 A1 | 12/2002 | Korus et al. | 370/349 |
| 2003/0035398 A1 | 2/2003 | Sato | 370/338 |

(Continued)

FOREIGN PATENT DOCUMENTS

AU 2003 257074 7/2002

(Continued)

OTHER PUBLICATIONS

Estrin et al., "Protocol Independent Multicast-Sparse Mode (PIM-SM): Protocol Specification", Internet Draft of the IETF, Sep. 9, 1997, pp. 1-51.*

(Continued)

*Primary Examiner* — Michael J Moore, Jr.
(74) *Attorney, Agent, or Firm* — Campbell Stephenson LLP

(57) ABSTRACT

A system and method of generating a channel address. The method includes mapping a first address, obtained from a membership report, to a second address to generate a channel address. A multicast network device (MND) for subscribing one or more hosts on a multicast network to one or more channels is disclosed. The MND includes a memory containing a first address and a SSM mapping engine configured to map the first address to a second address to generate a channel address, identifying a channel, in response to the first address contained in the memory.

24 Claims, 4 Drawing Sheets

U.S. PATENT DOCUMENTS

| | | | | |
|---|---|---|---|---|
| 2004/0100983 | A1 | 5/2004 | Suzuki | 370/432 |
| 2004/0122890 | A1 | 6/2004 | Watkinson | 709/203 |
| 2005/0076207 | A1 | 4/2005 | Park et al. | 713/163 |
| 2006/0062220 | A1 | 3/2006 | Suga | 370/392 |
| 2006/0088031 | A1 | 4/2006 | Nalawade | 370/390 |
| 2006/0133375 | A1 | 6/2006 | Napierala | 370/390 |
| 2006/0159092 | A1* | 7/2006 | Boers et al. | 370/390 |

FOREIGN PATENT DOCUMENTS

| | | |
|---|---|---|
| CN | ZL 03 8 18291.2 | 7/2003 |
| EP | 07122045.3 | 11/2007 |
| WO | WO 00/51370 A1 | 8/2000 |
| WO | WO 02/45334 A1 | 7/2002 |
| WO | WO 2004/012390 A1 | 2/2004 |

OTHER PUBLICATIONS

S. Deering, "RFC1112—Host Extensions for IP Multicasting," Internet RFC/STD/FYI/BCP Archives, Aug. 1989, pp. 1-13, http://www.faqs.org/rfcs/rfc1112.html.

"Stephen's Multicast Study: Protocol Independant Multicast (PIM)," NIST/ITL Advanced Network Technologies Division Software Distribution, Jun. 14, 1998, pp. 1-8, http://dns.antd.nist.gov/snad-staff/night/multicast/multpim.html.

"Source Specific Multicast (SSM) Homepage," Cisco IOS Software—IP Multicast Development & Dev/Test Groups, Nov. 29, 2000, pp. 1-6, ftp://ftpeng.cisco.com/ipmulticast/ssm/index.html.

H. Holbrook and B. Cain, "Source-Specific Multicast For IP," Internet Engineering Task Force (IETF), Nov. 21, 2001, pp. 1-14, http://www.ietf.org/internet-drafts/draft-ietf-ssm-arch-00.txt.

B. Haberman, "IGMPv3 and Multicast Routing Protocol Interaction," Internet Engineering Task Force (IETF), Feb. 2002, pp. 1-5, http://www.ietf.org/internet-drafts/draft-ietf-magma-igmpv3-and-routing-02.txt.

Supratik Bhattacharyya et al., "An Overview of Source-Specific Multicast (SSM),"Internet Engineering Task Force (IETF), Mar. 4, 2002, pp. 1-13, http://www.ietf.org/internet-drafts/drafts-ietf-ssm-overview-03.txt.

"IP Multicast Technology Overview," Cisco Systems, Inc., Apr. 18, 2002, pp. 1-24, http://www.cisco.com/univercd/cc/td/doc/cisintwk/intsolns/mcst_sol/mcst_ovr.htm.

Brad Cain et al., "Internet Group Management Protocol, Version 3," Internet Engineering Task Force (IETF), May 2002, pp. 1-38.

Holbrook, Hugh W. and Cheriton, David R., "IP Multicast Channels: Express Support for Large-Scale Single-Source Applications," Computer Communications Review, Association for Computing Machinery, vol. 29, No. 4, Oct. 1999, pp. 65-78.

"Multicast Routing on the Internet," Multicast Communication, Protocols and Applications, May 12, 2000, pp. 105-121.

International Search Report as mailed from the PCT on Nov. 28, 2003, for counterpart WO Application (PCT/US03/23944; Filed Jul. 31, 2003), 7 pages.

Estrin, et al., "Protocol Independent Multicast-Sparse Mode (PIM-SM): Protocol Specification", Internet Draft of the IETF, Sep. 9, 1997, pp. 1-51.

Alvarez, Daniel, et al., pending U.S. Patent Application entitled "PIM Sparse Mode to Source Specific Multicast Conversion," U.S. Appl. No. 10/777,601; filed Feb. 12, 2004, including Specification: pp. 1-14; Drawings: Figures 1-5 on 4 sheets.

* cited by examiner

SOURCE SPECIFIC MULTICAST GROUP TO SOURCE MAPPING

BACKGROUND OF THE INVENTION

1. Field of the Invention

The present invention relates generally to internet protocols and, more specifically, to a host subscription management protocol.

2. Description of the Related Art

Internet Protocol (IP) communications generally provide three different types of host communication methods across a network, unicast, broadcast, and multicast. Unicast is a method of point-to-point communication most often used when two hosts need to exchange data with one another and are not concerned with sharing the data with multiple hosts. Broadcast is meant to reach all hosts on a broadcast domain, and multicast allows a group of hosts to receive messages without broadcasting those messages to all of the hosts in a broadcast domain.

An Overview Multicast

Multicast is often the preferred method of communication for many common network distribution applications. This is so because multicast is a bandwidth-conserving technology that reduces traffic by simultaneously delivering data to multiple hosts. An example of an application which utilizes multicast is a video conferencing application. Those hosts wishing to receive the video can join a group, the group having a multicast group IP address. Once the receivers have joined the multicast group, a server responsible for sending the video need only send the video to the multicast group IP address (as opposed to sending the video specifically to each individual host (unicast), or to every host on the network (broadcast)). Other applications which use multicast include corporate communications, distance learning, and distribution of software, stock quotes, and news.

Multicast delivers data to multiple receivers without burdening the source host. This is so because multicast packets are replicated in the network by multicast-enabled routers at the point where paths diverge (multicast-enabled routers are routers which are configured to support multicasting). In contrast, many alternatives to multicast require the source to send more than one copy of the data.

The Multicast Group

Multicast is based on the concept of a group. A multicast group is an arbitrary group of receivers that express an interest in receiving a particular data stream from a source. A host desiring to receive data sent to a multicast group must join the group using Internet Management Group Protocol (IGMP) (discussed below). Only hosts which are members of a given multicast group can receive data sent to that multicast group.

Internet Group Management Protocol (IGMP)

IGMP is a protocol used by hosts and multicast-enabled routers to form and manage a multicast group. To join a group, a host sends an IGMP membership report to a local multicast router. The membership report indicates to the local multicast router that the host is interested in joining a particular multicast group. The address of the multicast group is included in the membership report. The router, recognizing that the host wishes to join the group, establishes a path form the source to the host, and then forwards data to the host accordingly.

There are multiple versions of IGMP, and, consequently, multiple versions of membership reports. IGMP version 1 (IGMPv1) and IGMP version 2 (IGMPv2) membership reports allow a host to include a group address to identify the group which the host wishes to join. IGMP version 3 (IGMPv3) extends the capabilities of IGMPv1 and IGMPv2 by allowing a host to identify not only the group which the host wishes to join, but also the source the host expects the data to be sent from.

Source Specific Multicast (SSM)

It is possible for multiple sources to transmit data to a single multicast group. For example, one source may transmit stock quotes to a multicast group while another source may transmit video conferencing information to the same multicast group. A host which has joined the multicast group to receive the stock quotes may receive, unwillingly, the video conferencing data as well. To alleviate this potential burden, Source Specific Multicast (SSM) extends existing multicast protocols by providing "source filtering" within a multicast network With source filtering, when a host joins a particular multicast group, the host can specify not only the multicast group the host wishes to join, but also the source from which data sent to the multicast group is expected. Source filtering allows a host to block out unwanted or even malicious data streams sent from unknown sources to the multicast group.

SSM implements source filtering through channels, which can be thought of as an extension of groups. A channel is identified by an SSM group address (G) and a source address (S). A source transmits data to a SSM group address (G). A host can receive the data only by subscribing to the channel (S,G) (pronounced S comma G). Thus, a host preferably needs to know both the SSM group address (G) and the source address (S) before the host can subscribe to a channel. The ability to specify a SSM channel address is provided in IGMPv3 membership report (recall from the description above in which an IGMPv3 report allows a host to provide both a group and a source address).

However, many hosts are not configured with IGMPv3, and/or lack the ability to send an IGMPv3 membership report. Although hosts configured with IGMPv1 or IGMPv2 have the ability to specify a group address in a membership report, such hosts lack the ability to specify a source address. Additionally, the potentially large number of host on a network not configured with IGMPv3, and the lack of an efficient upgrade method suggests that these host may not be configured with IGMPv3 for some time. This greatly limits the use of SSM. Consequently, many applications that were designed to operate in an SSM network are useless until the hosts become IGMPv3 compatible. Accordingly, there exists the need for a system and a method of achieving SSM functionality in a network where one, some or all of the hosts lack the ability to subscribe to a channel.

SUMMARY

A method of generating a channel address is disclosed. The method includes mapping a first address, obtained from a membership report, to a second address to generate a channel address.

In another embodiment, a multicast network device (MND) for subscribing one or more hosts on a multicast network to one or more channels is disclosed. The MND includes a memory containing a first address and a SSM mapping engine configured to map the first address to a second address to generate a channel address, identifying a channel, in response to the first address contained in the memory.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Introduction

Embodiments of the present invention generally allow a host, by providing preferably a single address, to subscribe to and receive data transmitted on a channel within a multicast network. The following sets forth a detailed description of a mode for carrying out the present invention. The description is intended to be illustrative of the invention and should not be taken as limiting.

Network Components

Figure 1:
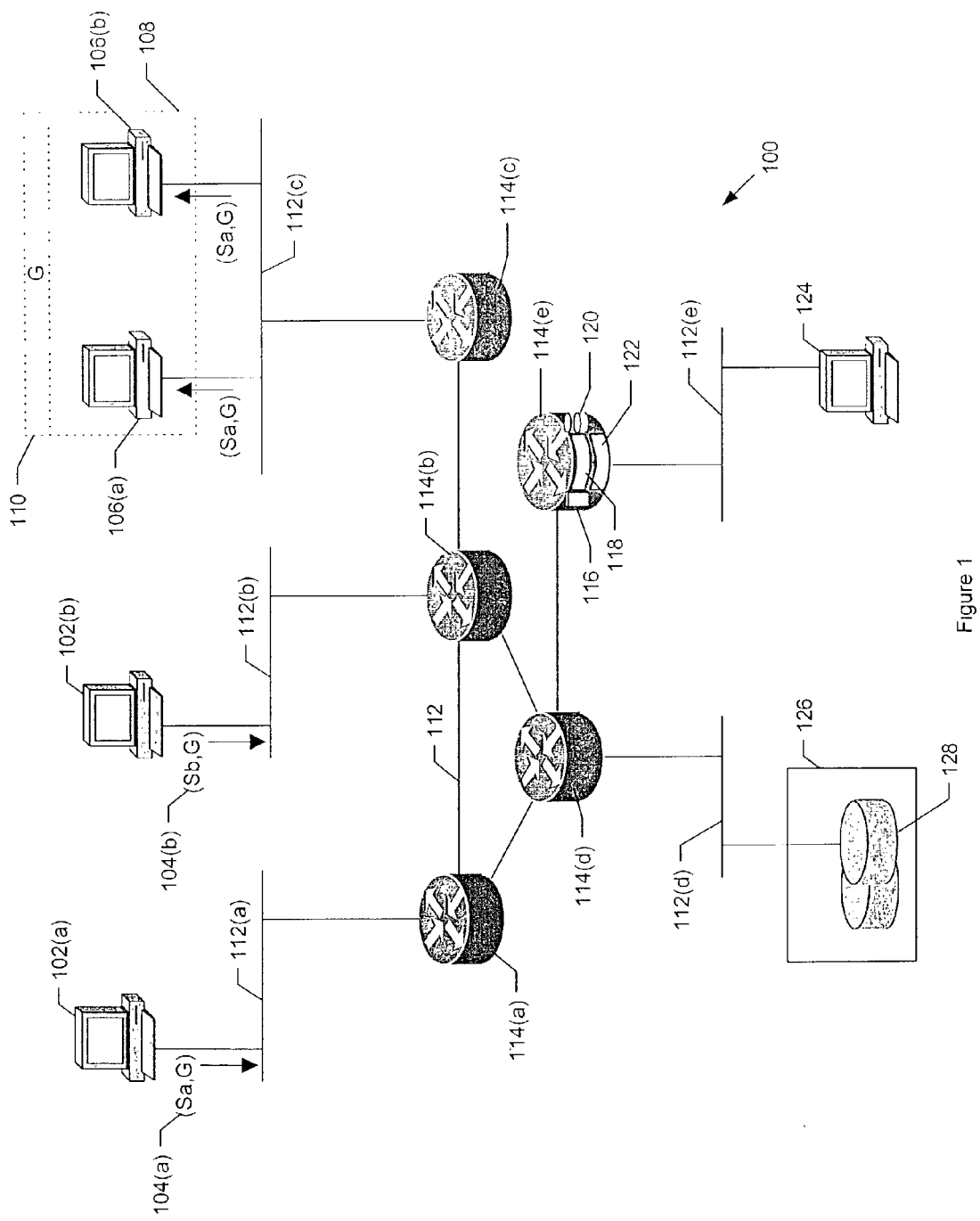
FIG. 1 illustrates an exemplary network according to one embodiment of the present invention.

FIG. 1 illustrates an exemplary network 100 according to one embodiment of the present invention. Network 100 includes sources 102 configured to transmit data on channels 104 to receivers 106. Network 100 is preferably a source specific multicast (SSM) enhanced network configured to support SSM communications. Sources 102 are preferably SSM sources. A SSM source, as used herein, refers to a host that is configured to transmit data to a SSM group address (G). Receivers 106 are preferably SSM receivers. A SSM receiver, as used herein, refers to a host that is configured to receive data transmitted by a SSM source. Although it is preferable that sources 102 and receivers 106 be SSM sources and SSM receivers, respectively, sources 102 and receivers 106 can be any host capable of communicating on network 100. A channel, as used herein, identifies a SSM data path (also referred to as a tree) associated with a SSM source (S) and a destination SSM group address (G). A channel is identified by a channel address (S, G) (pronounced S comma G), where S represents the address of a source configured to transmit data on the channel to the destination SSM group address represented by G.

Receivers 106 are members of a group 108 addressed by group address (G) 110. Group 108 is preferably a SSM group and group address 110 is preferably a SSM group address. However, group 108 and group address 110 may be any group and group address which allow for multicasting communications.

Network 100 also includes communication pathways 112 and multicast network devices (MNDs) 114. Each communication pathway 112 may be a direct communication link, a local area network (LAN), a wide area network (WAN), an IP based network (such as the internet), or some combination thereof. Each MND may be a multicast router, for example, or a similarly configured system capable of processing data on network 100. MND 114(e) includes a memory 116, a SSM mapping engine 118, a SSM mapping database 120, and a messaging engine 122. Although it is not required, one or more other MNDs 114 in addition to MND 114(e) may each include a memory 116, a SSM mapping engine 118, a SSM mapping database 120, and a messaging engine 122. In the described embodiment, messaging engine 122 is an IGMP module, however, messaging engine 122 may also be any other messaging engine used in a multicast network to support multicasting. A host 124 and a system 126, including a database 128, are also connected to network 100.

Network Configuration and Operation

As an aid in understanding the present invention, the described embodiment of the present invention is presented in the context of utilizing a host membership report containing preferably a single address to allow host 124 to subscribe to one or more channels, for example channel 104(a). As used herein, a host membership report refers to data transmitted by a host to indicate the host's desire to become a member of a multicast group. The described configuration of network 100 is presented only to provide a context in which the present invention may be more easily understood and is not intended to be limiting.

Source 102(a) is preferably configured to transmit data on channel 104(a). Channel 104(a) is represented by channel address (Sa, G) to indicate that source 102(a) is preferably configured to transmit data to SSM group address 110 (represented by G). Similarly, SSM source 102(b) is configured to transmit data on channel 104(b). Channel 104(b) is represented by channel address (Sb, G) to indicate that source 102(b) is also configured to transmit data to SSM group address 110. Receivers 106 are preferably configured to receive data only on channel 104(a), and are therefore able to block out any data transmitted on channel 104(b).

Transmitting a Membership Report

Figure 2A:
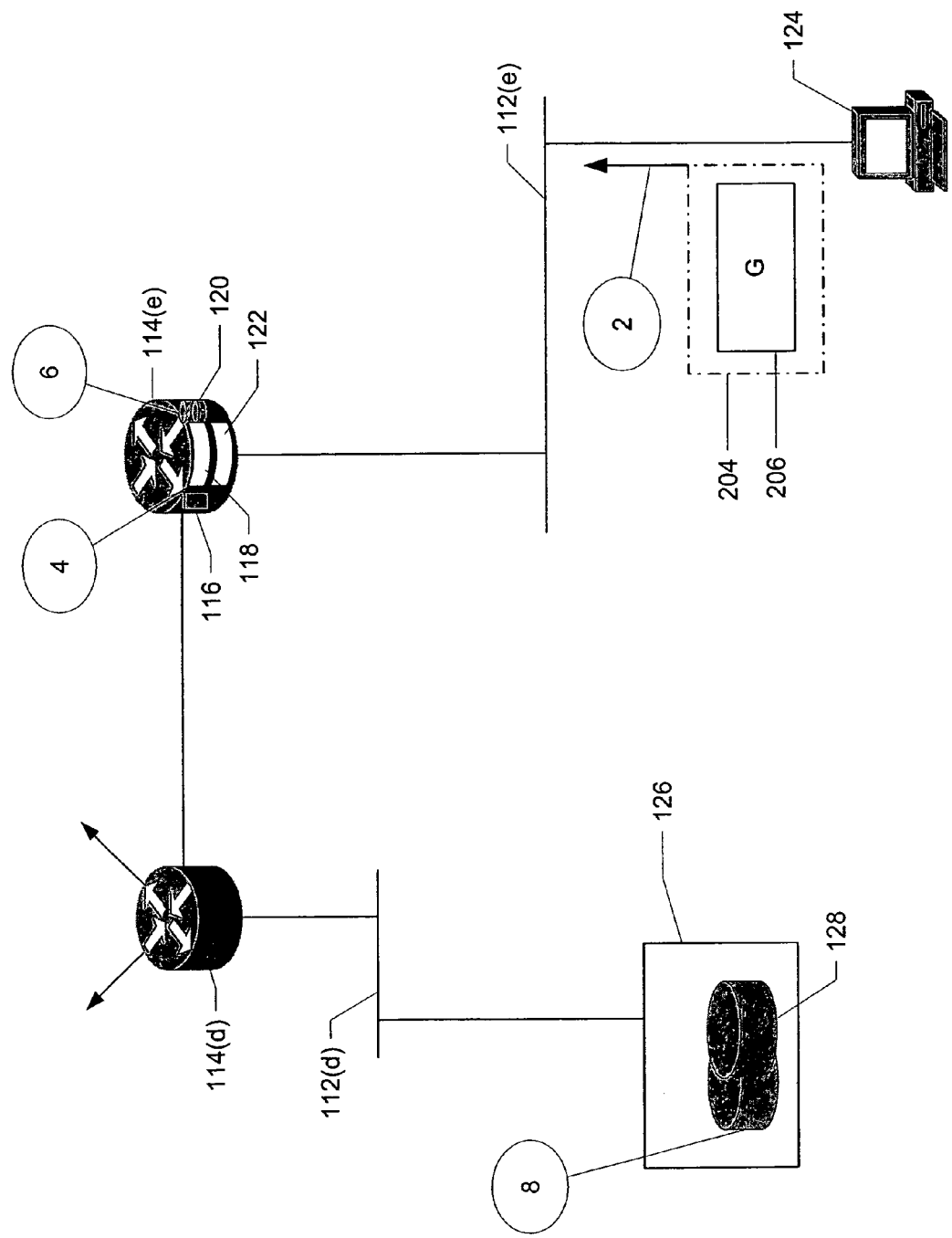
FIGS. 2(A-B) illustrate the actions involved in enabling host to receive data transmitted on one or more channels according to the present invention.
Figure 2B:
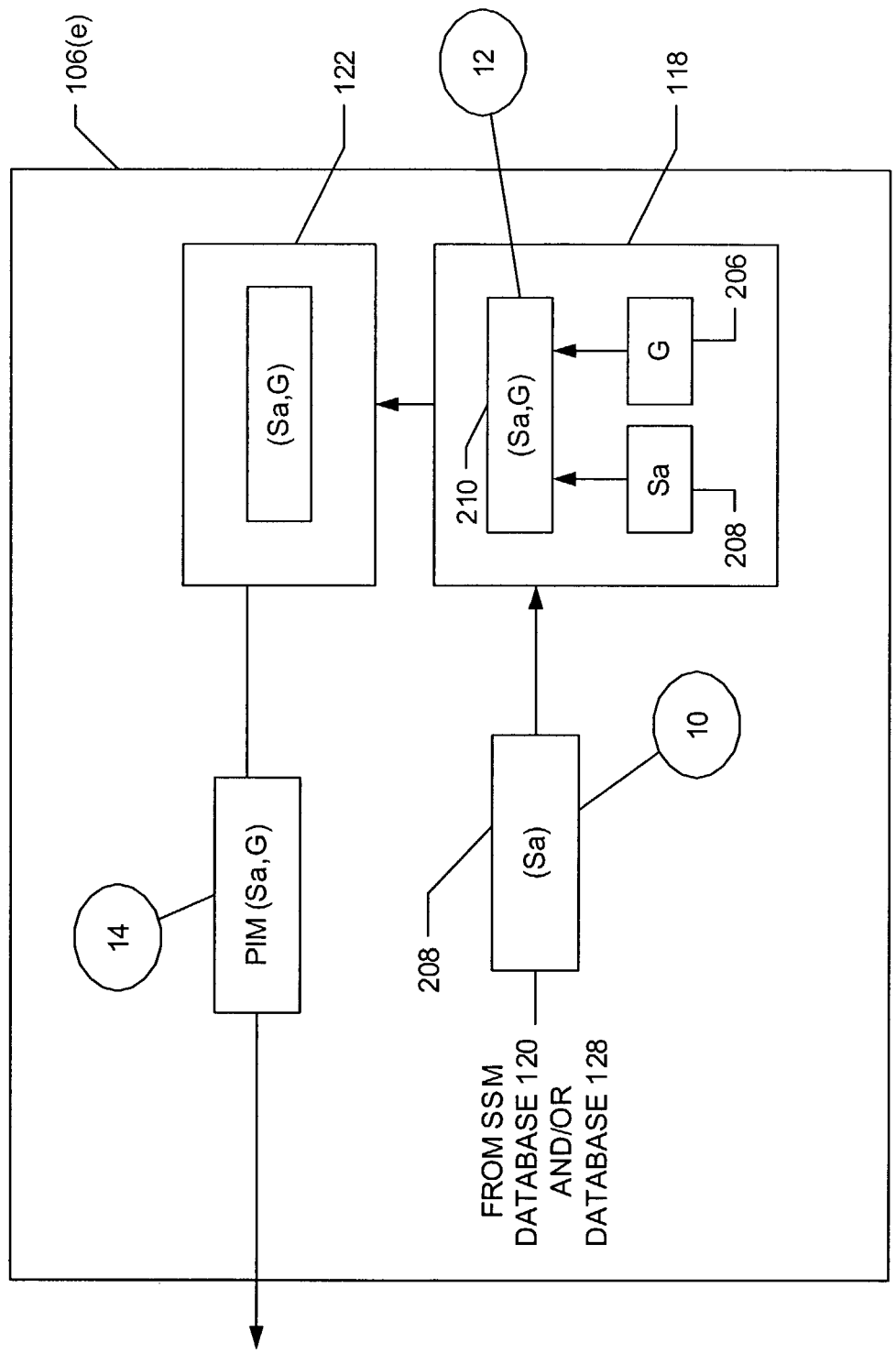

FIGS. 2(A-B) illustrate the actions involved in enabling host 124 to receive data transmitted on channel 104(a) according to the present invention. Initially, at action 2, host 124 transmits a host subscription protocol message 204, including a first address 206, to MND 114(e). Preferably, in the described embodiment, subscription protocol message 204 is an Internet Group Management Protocol version 1 (IGMPv1) or version 2 (IGMPv2) membership report and first address 206 is a SSM group address, for example SSM group address 110, representing the group component of the channel that host 124 wishes to subscribe to. For clarity of description, henceforth, SSM group address 206 will refer to first address 206.

IGMP is a host subscription protocol used by hosts, such as host 124, to report host group memberships to immediately-neighboring multicast routers, such as MND 114(e). In embodiments in which subscription protocol message 204 is an IGMP membership report, the IGMP membership report is preferably sent by the TCP/IP (Transmission Control Protocol/Internet Protocol) stack running on host 124 when an application opens a multicast socket on host 124.

Mapping Addresses

At action 4, messaging engine 120 receives host subscription protocol message 204 in memory 116 and provides the data contained therein, including SSM group address 206, to Source Specific Multicast (SSM) mapping engine 118. In one embodiment of the present invention, MND 114(e) is a multicast router configured to execute computer readable code, and SSM mapping engine 118 consists of multiple modules of computer readable code designed to allow a host, such as host 124, to receive data on a multicast channel, such as channel 104(a).

At action 6, SSM mapping engine 118 receives SSM group address 206 and queries static SSM mapping database 120 to obtain a second address 208 corresponding to SSM group address 206. In the described embodiment, second address 208 is preferably an address of a source (for example SSM source 102(a)) configured to transmit data to a group address, for example SSM group address 206. All corresponding SSM source address(es) found for SSM group address 206, if any, are returned to SSM mapping engine 118 to be cached and further processed as described below. For ease of description, henceforth, SSM source address 208 will be used to refer to second address 208.

The mapping of SSM group address 206 to a corresponding SSM source address 208 is preferably performed at the IGMP layer (i.e., IGMP commands and protocols are utilized). Static SSM mappings should preferably be configured before a query of static SSM mapping database 120 takes place. To configure static SSM mapping database 120, static SSM mapping is enabled, and SSM mapping database 120 is constructed. Preferably, to enable static SSM mapping, the command "ip igrnp ssm-map enable" is entered on MND 114(e). To build static SSM mapping database 120, the command "ip igmp ssm-map static <acl-x> <source-x IP address>" is entered, preferably on MND 114(e). The <acl-x> parameter is used to specify the SSM group addresses that are to be mapped to the <source-x IP address> parameter. For example, in the described embodiment, the following commands are preferably entered to build static SSM mapping database 120:

```
ip igmp ssm-map static <group address> <source 1 address>
ip igmp ssm-map static <group address> <source 2 address>
```

It is recognized that <group address> is the IP address of a group, for example group 108, <source 1 address> is the IP address for a first source, for example source 102(a) to be mapped to the group, and <source 2 address> is the IP address for a second source, for example source 102(b), to also be mapped to the group. This command may be repeated for any number of group address that are to be mapped to the designated source addresses.

At action 8, following the query of static SSM mapping database 120, SSM mapping engine 118 queries database 128 of system 126. In the described embodiment, system 126 is a DNS (Domain Name Server). If desired, the query of database 128 may be disabled with the command: "no ip igmp ssm-map query dns". Domain servers should preferably be configured on MND 114(e) in order to query database 128. This can be accomplished with the following command: "ip domain-server <ip-address>."

In constructing database 128, in order to find the sources corresponding to a particular multicast group, preferably, a reverse DNS lookup is performed with the multicast group IP address using A records. If system 126 includes a corresponding source address for the group address, system 126 will return the corresponding source address. Otherwise system 126 preferably forwards the query to a known root DNS server (not shown). In one embodiment of the present invention, a network administrator of system 126 preferably determines the mapping of source addresses to group address and constructs database 128 accordingly.

At action 10, a source address 208 corresponding to the SSM group address 206 is located within database 128 and is returned to SSM Mapping Engine 118. It is preferable that local configured mappings obtained from static SSM mapping database 120 take priority over dynamic mappings contained with database 128. When received, SSM Mapping Engine 118 preferably caches source address 208 and generates a channel address 210 from SSM group address 206 and SSM source address 208, at action 12.

At action 14, MND 114(e) initiates a Protocol Independent Multicast (PIM) join 210, including the channel address of channel 104(a), to source 102(a). PIM is an independent routing protocol and can be used to construct a shortest communication path between a SSM source (e.g., source 102(a)) and a SSM receiver (e.g., receiver 106(a)). The PIM join message 210 preferably establishes a pathway between host 124 and source 102(a) which allows host 124 to receive data transmitted by source 102(a) on channel 104(a).

Figure 3:
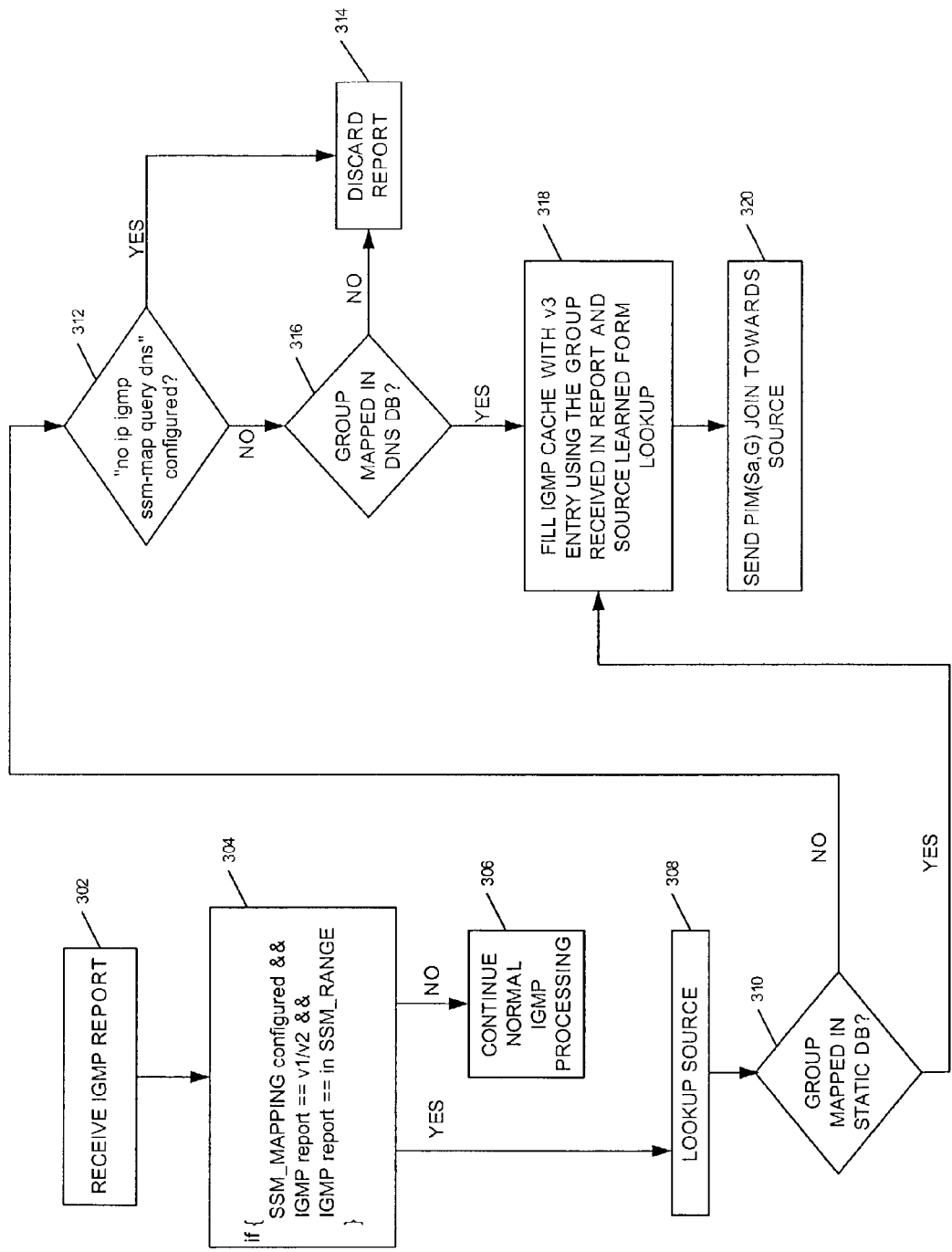
FIG. 3 is a flow chart illustrating the actions generally performed by SSM mapping engine to enable a host to receive data on a channel according to the present invention.

FIG. 3 is a flow chart illustrating the actions generally performed by SSM mapping engine 118 to enable a host, such as host 124, to receive data on a channel, such as channel 104(a), utilizing only an IGMPv1 or IGMPv2 membership report for example, according to the present invention.

Initially, messaging engine 120 receives an IGMP membership report including a group address (e.g., group address 208) in memory 116 (step 302). The group address in the IGMP membership report identifies the group component of the channel (e.g., channel 104(a)) which host 124 wishes to subscribe to. Following the receipt of the IGMP report, SSM mapping engine 118 preferably performs certain verifications, as illustrated by the pseudo-code in step 304. SSM mapping engine 118 preferably verifies that static SSM mappings are configured (as described with reference to FIG. 2 above), that the IGMP report is a valid IGMP v1 or a IGMP v2 report, and that the group address included in the IGMP report is a valid SSM group address. If any one of the verifications fail, SSM mapping engine 118 continues normal IGMP processing. However, if preferably all of the verifications are satisfied, SSM mapping engine 118 queries a SSM static database (e.g., SSM static database 120) and a domain name server (DNS) database (e.g., database 128) for a source address corresponding to the SSM group address provided in the IGMP report (step 308).

SSM mapping engine 118 first queries a SSM static database. Should a corresponding source address (e.g., source address 208) be located, the source address is preferably cached and a channel address is formed (e.g., channel address 210) ("YES" branch of decision block 310 and step 318). However, if a corresponding source address is not located in the SSM static database, SSM mapping engine 118 proceeds to query a DNS database ("NO" branch of decision block 310).

Before querying the DNS database, SSM mapping engine verifies that such a query has been enabled (decision block 312). If the query of the DNS database is not enabled, and no corresponding source address has been located in the SSM static database, the IGMP report is preferably ignored ("YES branch of decision block 312 and step 314). However, if the query of the DNS database is enabled, SSM mapping engine queries the DNS database for a source address corresponding to the group address provided in the IGMP report ("NO" branch of decision block 316 and decision block 316).

If no corresponding source address is located in the DNS database, the IGMP report is preferably ignored ("NO" branch of decision block 316 and step 314). However, if a corresponding source address is located in the DNS database, the corresponding source address is returned to SSM mapping engine 118 where the source address is cached and used to form the channel address (e.g., channel address 210) ("YES" branch of decision block 316 and step 318).

In step 320, SSM mapping engine 118 initiates a Protocol Independent Multicast PIM (Sa,G) join to the source address obtained from the SSM static database and/or the source obtained from the DNS database. In another embodiment of the present invention, SSM mapping engine 118 initiates a PIM (Sx, G) join to one ore more or all source addresses obtained from the SSM static database and/or the DNS database (where Sx is the address of the source the PIM join is transmitted to). Joining host 124 to channel 104(a) is also referred to as subscribing host 124 to channel 104(a). The PIM (Sa,G) join establishes a pathway between host 124 and the source identified by the obtained source address. This pathway allows host 124 to receive data transmitted by the source on the corresponding channel (e.g., source 102(a) on channel 104(a)).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method performed on a multicast network device, said method comprising:
    mapping a first address to a second address in response to receiving a first membership report, wherein the first membership report comprises the first address, and
        said second address is a source address of a host configured to transmit data, which originates at the host, to receivers via a channel identified by the first and second addresses;
    generating a protocol independent multicast (PIM) join, wherein
        the PIM join comprises the first and second addresses;
    sending the PIM join toward the host; and
    receiving data packets comprising the first address and the second address;
    wherein said mapping comprises:
    querying a first memory with said first address;
    receiving said second address from said first memory in response to querying said first memory with said first address.

2. The method of claim 1, wherein said first address is a multicast group address.

3. The method of claim 1, wherein said membership report is an IGMP membership report.

4. The method of claim 1, wherein said membership report is at least one of an IGMP version 1 membership report and an IGMP version 2 membership report.

5. The method of claim 1, wherein said mapping occurs at an IGMP layer.

6. The method of claim 1, wherein said first memory is at least one of a Domain Name Server (DNS) database and a local Source Specific Multicast (SSM) mapping database.

7. The method of claim 1, further comprising:
    receiving said membership report from another host.

8. A multicast network device (MND) comprising:
    a first device configured to query a first memory with a first address to receive a second address and to generate a protocol independent multicast (PIM) join, wherein,
        said second address is an address of a source configured to transmit data, which originates at the source, to receivers on a channel identified by the first and second addresses,
        the PIM join comprises the first and second addresses, and
        the first device is configured to query the first memory and generate the PIM join in response to receiving a membership report comprising the first address; and
    a second device configured to receive data packets comprising the first address and the second address.

9. The MND of claim 8, further comprising:
    the first memory that comprises a database containing information relating said first address to said second address.

10. The MND of claim 9 wherein the database is a domain name server database.

11. The MND of claim 9 wherein the database is a local database on said MND.

12. The MND of claim 11, wherein said first device comprises an IGMP messaging module.

13. The MND of claim 8, wherein said first address is a multicast group address.

14. A non-transitory computer-readable medium comprising instructions stored thereon, the instructions comprising:
    a first set of instructions, executable on one or more processors, configured to map a first address to a second address, wherein said first address is obtained from a membership report, wherein said first set of instructions comprises a first subset of instructions configured to query a memory with said first address to obtain said second address; and
    a second set of instructions, executable on said one or more processors, configured to generate a protocol independent (PIM) join, wherein
        the PIM join comprises said first address and said second address, and
        said second address is an address of a source configured to transmit data, which originates at the source, to receivers via a channel identified by said first and second addresses.

15. The non-transitory computer-readable medium of claim 14 wherein the instructions further comprise:
    a fourth set of instructions, executable on one or more processors, configured to transmit the PIM join directly or indirectly to the source identified by said second address.

16. The non-transitory computer-readable medium of claim 14, wherein said first address is a multicast group address.

17. A multicast network device (MND) comprising:
    means for mapping a second address to a first address, wherein said mapping comprises:
        querying a first memory with said first address;
        receiving said second address from said first memory in response to querying said first memory with said first address;
    means for generating a protocol independent multicast (PIM) join in response to the MND receiving a membership report comprising the first address, wherein
        the PIM join comprises the first and second addresses, and
        said second address is an address for a source configured to transmit data, which originates at the source, on a channel identified by the first and second addresses; and
    means for receiving data packets comprising the first address and the second address.

18. The MND of claim 17, further comprising:
    means for relating said first address to said second address.

19. The MND of claim 18 wherein said means for relating is a domain name server database.

20. The MND of claim 18 wherein said means for relating is a local database on said MND.

21. The MND of claim 17, further comprising:
means for transmitting the PIM join.

22. The MND of claim 17, wherein said first address is a multicast group address.

23. A method performed on a multicast network device, said method comprising:
mapping a first address to a second address in response to receiving a first membership report that comprises the first address but not the second address, wherein said second address is a source address of a host configured to transmit data, which originates at the host, to one or more receivers, wherein said mapping comprises:
querying a first memory with said first address;
receiving said second address from said first memory in response to querying said first memory with said first address;
generating a protocol independent multicast (PIM) join, wherein
the PIM join comprises the first and second addresses;
sending the PIM join toward the host; and
receiving data packets comprising the first address and the second address.

24. A multicast network device (MND) comprising:
a first device configured to query a first memory with a first address to obtain a second address in response to the MND receiving a membership report comprising the first address, wherein said second address is an address of a source configured to transmit data, which originates at the source, to receivers;
a second device configured to generate a protocol independent multicast (PIM) join comprising the first and second addresses; and
a third device configured to receive data packets comprising the first address and the second address.

* * * * *